United States Patent [19]

Miller et al.

[11] Patent Number: 4,464,702
[45] Date of Patent: Aug. 7, 1984

[54] EMI FILTER CAPACITOR UNIT

[75] Inventors: Gordon W. Miller, Vestal; Larry L. McClintock, Apalachin, both of N.Y.

[73] Assignee: The United States of America as represented by the Secretary of the Air Force, Washington, D.C.

[21] Appl. No.: 504,183

[22] Filed: Jun. 14, 1983

[51] Int. Cl.³ .............................................. H01G 4/38
[52] U.S. Cl. ................................................... 361/328
[58] Field of Search ........................ 361/302, 328, 331

[56] References Cited

U.S. PATENT DOCUMENTS

| | | | |
|---|---|---|---|
| 2,128,857 | 8/1938 | Stacy | 361/328 X |
| 2,264,994 | 12/1941 | Marbury et al. | 361/328 X |
| 2,835,874 | 5/1958 | First et al. | 361/302 X |
| 3,377,530 | 4/1968 | Meyers | 361/328 X |

*Primary Examiner*—Donald Griffin
*Attorney, Agent, or Firm*—Donald J. Singer; Bernard E. Franz

[57] ABSTRACT

The unit comprises several rolled capacitor elements in a single case, with a package concept that allows installation mounting and electrical interconnection on the same top plane. A U-shaped feedthrough bus in the form of a wide metal strip is routed from a top input terminal down the center of the case and up adjacent one wall to a top output terminal. The capacitor elements are in two sets on opposite sides of the center portion of the feedthrough bus, and connected thereto. A ground bus serving as an internal noise partition connected to the metal top is between the capacitor elements of one set and the outer portion of the feedthrough bus. A minimum of three units may be used with the variable speed constant frequency (VSCF) converter of the three-phase power supply system of an aircraft, for filtering and suppression of electromagnetic interference. The construction permits use of two input terminals bussed together, and two output terminals bussed together for handling large currents.

5 Claims, 6 Drawing Figures

EMI FILTER CAPACITOR UNIT

RIGHTS OF THE GOVERNMENT

The invention described herein may be manufactured and used by or for the Government of the United States for all governmental purposes without the payment of any royalty.

BACKGROUND OF THE INVENTION

This invention relates to an electromagnetic interference (EMI) noise suppression filter, and more particularly to a capacitor structure for use as such a filter.

Traditional Output Filter (EMI) Capacitors were configured in long rectangular housings with the input and output electrical interfaces on opposite ends. A straight feedthrough bus prevented cross wiring thereby minimizing internal leakage. The housing was comprised of a welded copper-nickel construction with captive mounting hardware and bolted electrical connections.

Electrical power in aircraft at 115 volts, 400 hertz, three phase may be supplied by a variable speed constant frequency (VSCF) converter, which comprises an electronic unit fed by a rotating machine mechanically coupled to the aircraft engines. The EMI filter capacitors are used between the converter and electric equipment on the aircraft.

SUMMARY OF THE INVENTION

An object of the invention is to provide a new package concept for an Output Filter Capacitor required on VSCF Converters that allows installation mounting and electrical interconnection on the same top plane.

The filter unit according to the invention has a U-shaped feedthrough bus which is routed from one terminal pair down the center of the metal housing, across one-half of the housing bottom, and returned up an adjacent outer wall to another pair of terminals. There are two sets of capacitor elements located in the housing on opposite sides of the portion of the bus that goes down the center, with each capacitor element having one of its terminals connected to that portion of the bus. The other (ground) terminals of each of the capacitor elements of each set connects to a wall of the housing. An internal noise partition extending from the top surface of the housing between the return feedthrough bus and the capacitor elements provides shielding and ground connection. The feedthrough bus and the internal noise partition may each be a wide strip of metal extending substantially across the housing. The center partitions and barriers minimize internal leakages.

DESCRIPTION OF THE PREFERRED EMBODIMENT

Figure 1:
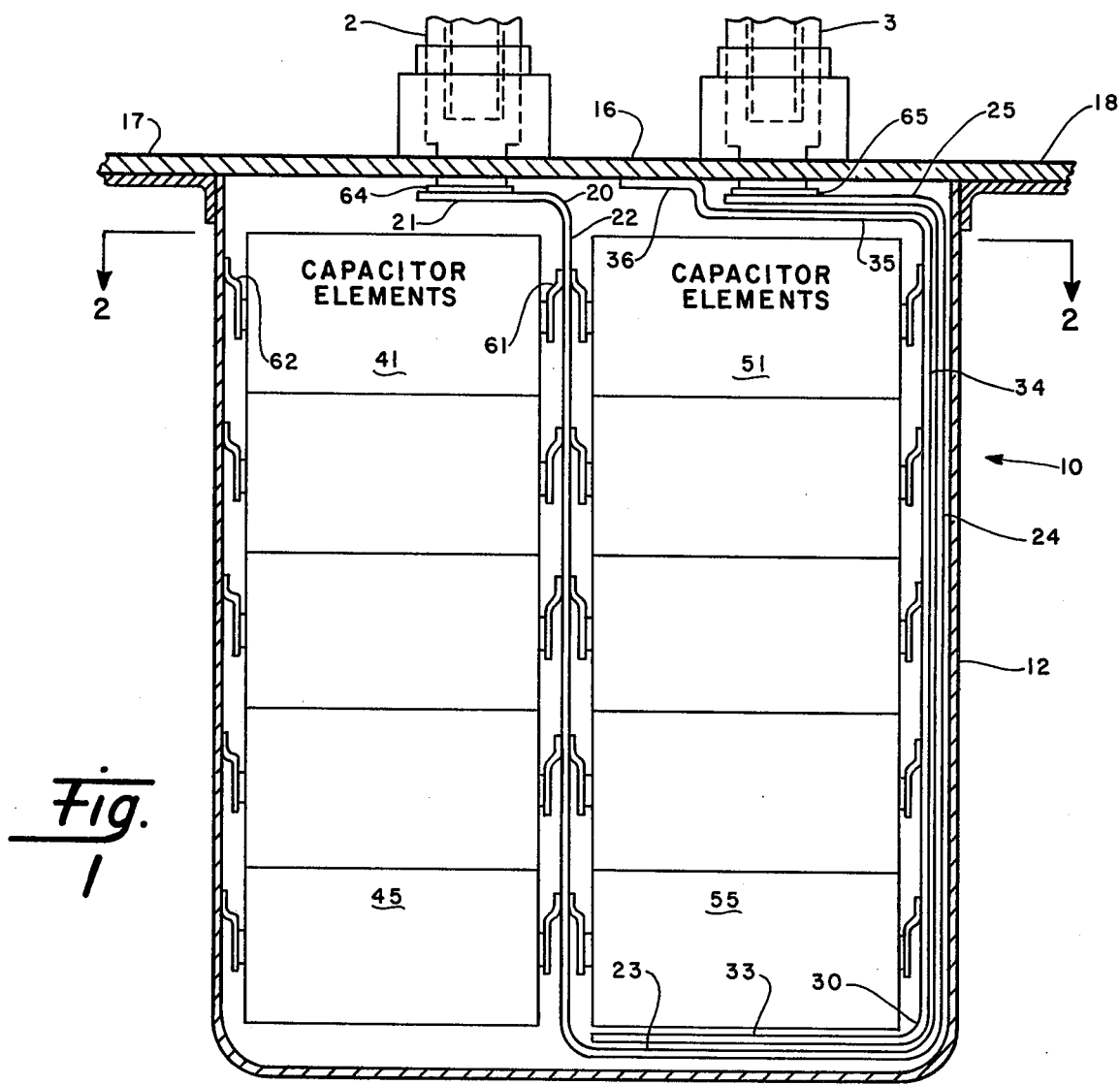
FIGS. 1 and 2 are vertical and horizontal sectional views (along lines 1—1 of FIG. 2 and lines 2—2 of FIG. 1) through the housing of a filter unit showing the internal arrangement of the components.
Figure 2:
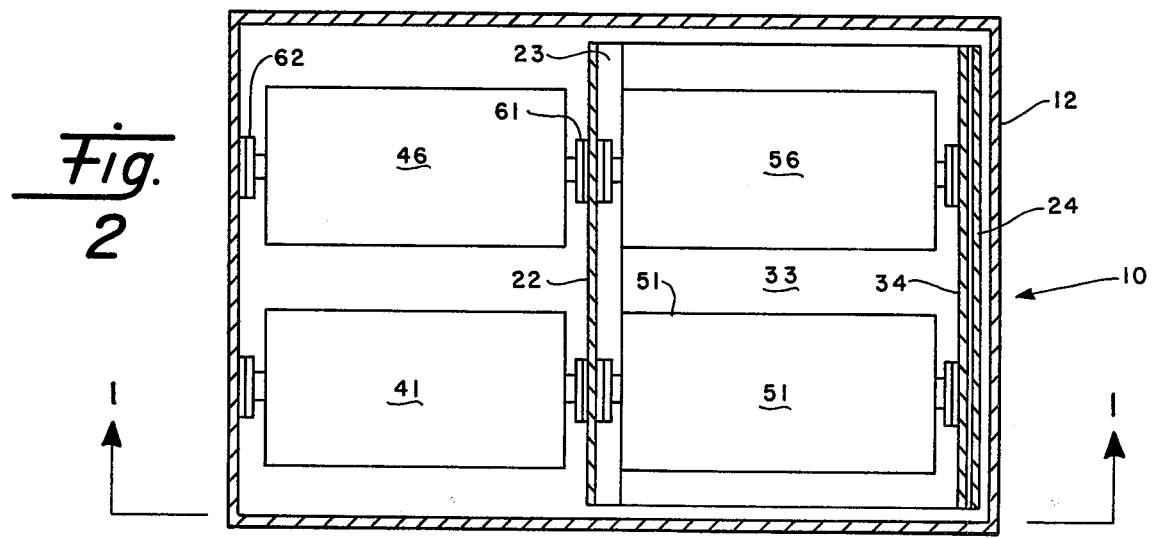

Two sectional views in FIGS. 1 and 2 show a filter capacitor unit 10 comprising twenty capacitor elements in one package. The case 12 may be of welded copper-nickel or stainless steel construction, which forms an approximately cubic housing (compared to the prior long rectangular housings). The housing has a top cover plate member 16 of similar metal with outboard mounting flanges 17 and 18. Reinforcing brackets may be provided between the flanges 17 and 18 and the case 12. The filter element interconnection bus (item 62) is 5 to 7 mils thick Cu or Brass.

A feedthrough bus 20 may be formed from a sheet of brass fifty to 70 mils thick and nearly as wide as the interior width of the case. The main portion of this bus 20 is U-shaped with a portion 22 routed down the center, a portion 23 across one-half of the bottom, and an outer portion 24 returned up adjacent one wall of the case. The center portion 22 continues at the top to a horizontal connection portion 21, and the outer portion 24 continues at the top to a horizontal connecting portion 25. All of these portions 21–25 are formed from one continuous metal strip with a radius at the 90° bends between portions, as shown in FIG. 1.

A ground shield 30 serves as an internal noise partition. It comprises a bottom portion 33 across half of the bottom, a vertical portion 34, and a top portion 35, all of which are located adjacent to and inside of the feedthrough bus 20. The ground bus 30 terminates in a portion 36 connected to the metal top 16.

Each filter unit 10 has approximately 20 capacitor elements 41–60 in four (4) stacks of five (5) each or equivalent capacitor mass sufficient to provide the required capacitance. Elements 47–50 and 57–60 are not visible in the drawing. The two stacks with top elements 41 and 46 are on the left side of the feedthrough bus 20, and the two stacks with top elements 51 and 56 are on the right. Each element is a simple rolled capacitor with poly-sulfone or poly-carbonate dielectric, and with a terminal on each end. Each element has a connecting strap soldered or spot welded to each terminal, such as straps 61 and 62 on element 41. All twenty elements have the connecting strap on one end soldered or spot welded to the center portion 22 of the feedthrough bus 20. The ten elements 41–50 on the left have the connecting strap at the other end soldered or spot welded directly to one wall of the case 12, while for the other ten elements 51–60 the connection is to the portion 34 of the ground bus 30. The bus members 20 and 30 are tin plated to facilitate making the connections.

Figure 3:
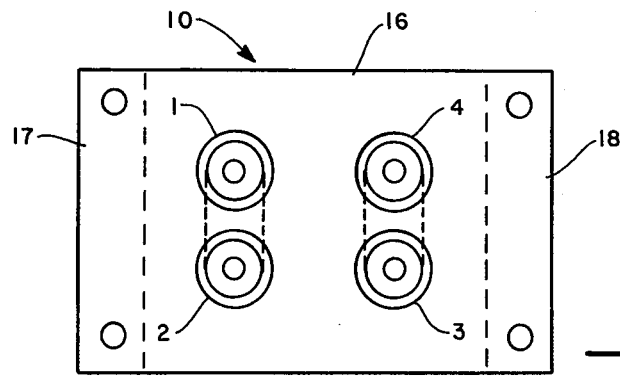
FIG. 3 is a top view of the filter unit.

As shown in the top view of FIG. 3, there are four conventional bolted electrical connection terminals 1, 2, 3 and 4 which are insulated from the metal top 16. The feedthrough bus 20 is connected to these terminals, with portion 21 connected to the terminal pair 1 and 2, for input current and the portion 25 connected to the terminal pair 3 and 4 for output current. Each of the flanges 17 and 18 has two mounting holes.

The filter unit 10 is potted, a suitable potting compound being a silicon-rubber, such as that designated by General Electric as RTV. For clarity, the potting compound is not shown in FIGS. 1 and 2. The potting between the feedthrough bus 20, the ground bus 30 and the case 12 maintains the desired spacing and provides support for the bus members.

Figure 4:
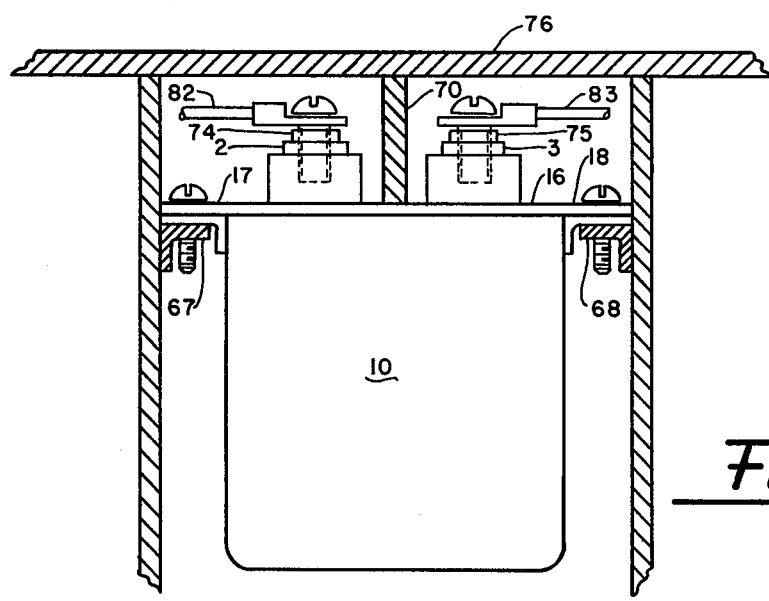
FIG. 4 is a side view, showing the mounting and connections.

FIG. 4 shows a side view of a mounted filter unit 10, with a sectional view of a fragment of a VSCF converter. The flanges 17 and 18 are bolted to metal shelves 67 and 68. A metal partition 70 separates the input terminal pair 1 and 2 from the output terminal pair 3 and 4, to block EMI fields. The converter has a metal cover 76 which encloses the filter terminal space. A cable 82 connected to terminal 1 and a similar cable to terminal 2 couple the output from the converter electronics to the filter input. These cables within the converter chassis may be two to three feet long. Note that there is high EMI noise sensitivity in the converter electronics. A cable 83 connected to terminal 3 and a similar cable to terminal 4 connect to aircraft power feeder cables which may be ten to thirty feet long. There is high EMI noise pick up from the aircraft, and also radiated susceptibility.

The insertion loss requirement for the filter unit 10 is greater than 70 dB from 0.2 to 4.0 megahertz. When the minimum requirement is plotted on a graph with frequency on a logarithmic scale, the portion below 0.2 megahertz is a straight line with 50 dB at 0.025 megahertz and about 42 dB at 0.01 megahertz. The portion above 4.0 megahertz is a straight line with 50 dB at 40 megahertz, 30 dB at 400 megahertz, and about 22 dB at 1000 megahertz.

Figure 5:
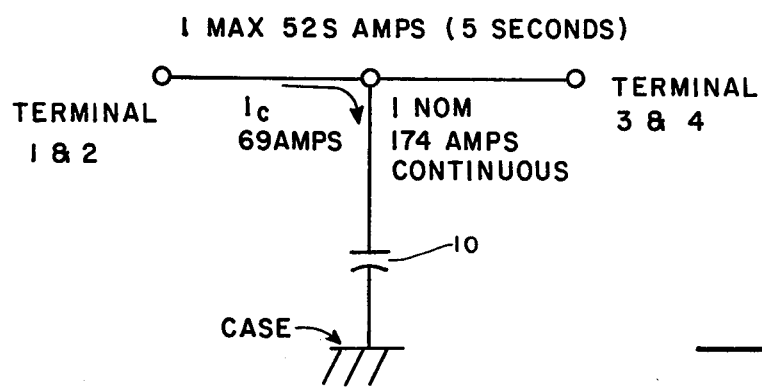
FIG. 5 is a circuit diagram.

FIG. 5 is an equivalent circuit diagram showing current requirements for a 240 microfarad filter capacitor 10 in a 60 KVA converter.

Figure 6:
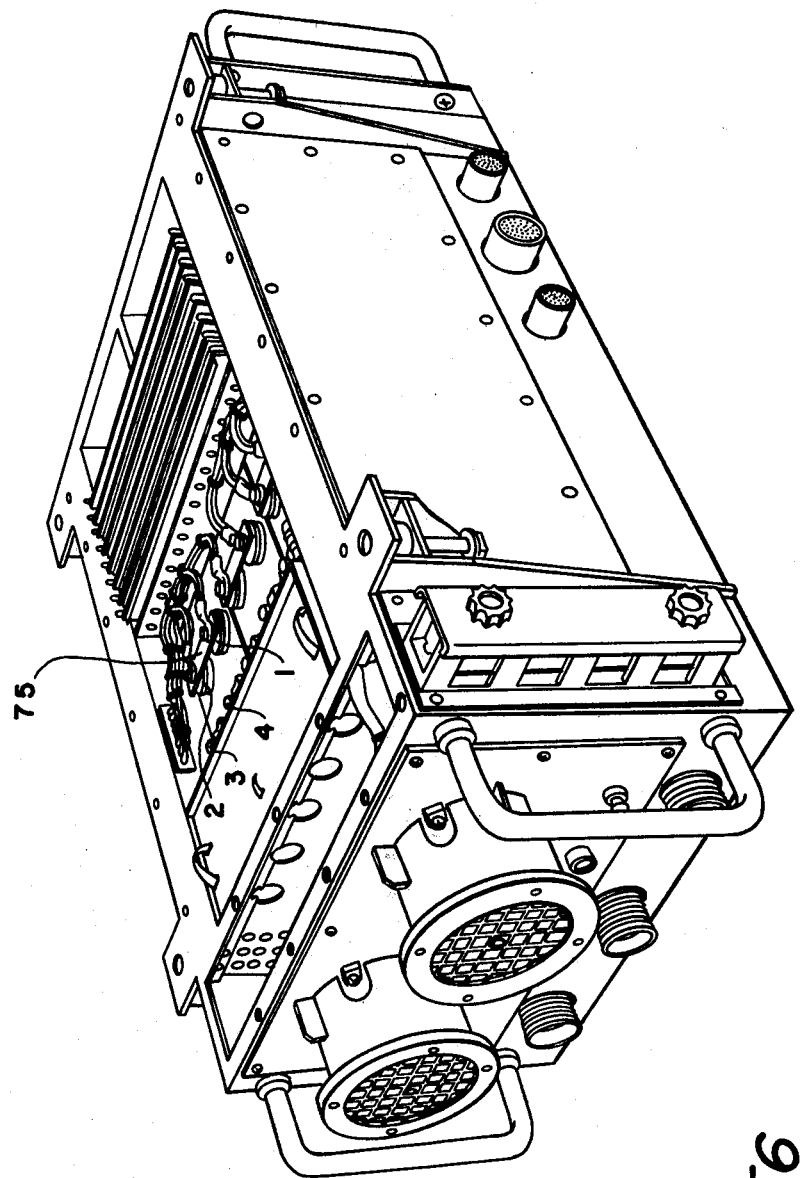
FIG. 6 is a perspective view of a VSCF converter unit, showing three filter capacitor units.

FIG. 6 is a perspective view traced from a photograph of an experimental VSCF converter, which houses the converter electronics and three filter capacitor units 10 (for the three phases). The top 76 and partition 70 (shown in FIG. 4) have been removed, and do not appear in FIG. 6. The terms "top" and "bottom" are used herein in a relative sense, and are not meant to imply any particular orientation for the mounting of the converter. The terminals 1, 2, 3 and 4 are numbered as in FIG. 3 for the furtherest filter unit 10 in FIG. 6.

The overall power system includes a dynamo mechanically driven by the aircraft engines. The three-phase dynamo output varies greatly in frequency and voltage, and the converter electronics converts this to regulated three phase, 115 volt, 400 cycle power. Note that the mounting shelves 67 and 68 (FIG. 4) are connected to the three-phase neutral.

The dimensions of a 240-microfarad filter unit 10 is 4.5 inches high from the lower surface of the top 16 to the bottom outer surface, 4.58 inches left to right in FIGS. 1 to 4 on the outside of case 12, and 3.0 inches for the other outside dimension of the case. The overall dimension between the outer edges of flanges 17 and 18 is 5.68 inches.

There are several significant advantages to the new packaging concept for the filter capacitor unit 10:

(a) It allows multiple (pairs) of common power connections required on the larger electrical systems to carry the higher current loads. Each pair of input and output connections is bussed together both internally (within the housing) and externally (by a brass bus bar) to share the current load. FIG. 1 shows the internal terminal bus plate 64 for terminals 1 and 2, and a similar bus plate 65 for terminals 3 and 4. FIG. 4 shows bus bar 74 for terminals 1 and 2, and bus bar 75 for terminals 3 and 4. The bus bars 75 are clearly visible in FIG. 6 (only one numbered).

(b) Facilitate converter assembly and simplify the wiring harness by allowing all hook up on the top surfaces of each capacitor within a common compartment.

(c) Due to its more efficient "form-factor", the capacitor packaging density is increased resulting in a reduced outline and weight.

It is fully compliant to the established EMI insertion loss requirements. The center partitions and barriers minimize internal EMI leakages. This final design is presently being used experimentally in a 60 KVA VSCF converter (quantity 3 filter capacitors per unit) for an Air Force aircraft.

Summary of advantages:

(1) Total access to all mounting and electrical interfaces from a single direction; i.e., all hardware is located on the top surface facing out from the converter.

(a) Facilitate installation.
(b) Facilitate maintenance.
(c) Facilitate test.

(2) Since the electrical interfaces are on the top surface, there is no longer any requirement to provide a volume with clearances on the bottom or sides. Traditional capacitors have the input and output terminals at opposite ends requiring significant space and high voltage clearances at each end.

Since the converters are used onboard flight aircraft, size, space and weight are highly valued parameters.

(3) Due to the new feedthrough "form-factor" and termination and routing of the capacitor windings, the resultant outline and weight is smaller with respect to capacitance than the traditional capacitors.

Thus, while preferred constructional features of the invention are embodied in the structure illustrated herein, it is to be understood that changes and variations may be made by the skilled in the art without departing from the spirit and scope of my invention.

I claim:

1. A filter capacitor unit for filtering and suppressing electromagnetic interference on a power supply line, said filter capacitor unit comprising:
 a metal case with a metal top, first terminal means and second terminal means mounted through said metal top and insulated therefrom,
 a feedthrough bus in the form of a wide U-shaped metal strip connected to the first terminal means inside the case, with a center portion passing down the center of the case, a bottom portion passing adjacent one-half of the bottom of the case, an outer portion passing up adjacent to one wall of the case, and connected to the second terminal means inside the case;
 a ground bus in the form of a wide metal strip serving as an internal noise partition connected to the metal top and extending adjacent said outer and bottom portions of the feedthrough bus, so that the feedthrough bus is between the ground bus and the case;
 a plurality of capacitor elements organized as two sets, with the capacitor elements of the first set connected between one side of the center portion of the feedthrough bus and one wall of the case, and the capacitor elements of the other set connected between the other side of the feedthrough bus and the ground bus.

2. A filter capacitor unit according to claim 1, wherein said first and second terminal means each comprises a pair of two terminals for connection to separate cables, the terminals of each pair having a bus between them outside the case, and another bus between them inside the case, to better share the current flow.

3. A filter capacitor unit according to claim 1, mounted in a structure having separate metal enclosures for the first terminal means and the second terminal means external to said case, including a metal barrier between them, and including said metal top.

4. In a three-phase power system, at least three filter capacitor units according to claim 3, with at least one unit for each phase, the three units being mounted in line with no significant space between adjacent ones, the first terminal means of all three units being in one of said metal enclosures, and the second terminal means of all three units being in another said metal enclosure.

5. In the system according to claim 4, wherein said first and second terminal means of each filter capacitor unit comprises a pair of two terminals for connection to separate cables, the terminals of each pair having a bus between them outside the case, and another bus between them inside the case, to better share the current flow.

* * * * *